(12) United States Patent
Kontomaris

(10) Patent No.: US 11,161,955 B2
(45) Date of Patent: Nov. 2, 2021

(54) AZEOTROPIC AND AZEOTROPE-LIKE COMPOSITIONS COMPRISING Z-1,1,1,4,4,4-HEXAFLUORO-2-BUTENE AND METHYL PERFLUOROPROPYL ETHER

(71) Applicant: The Chemours Company FC, LLC, Wilmington, DE (US)

(72) Inventor: Konstantinos Kontomaris, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 232 days.

(21) Appl. No.: 16/281,640

(22) Filed: Feb. 21, 2019

(65) Prior Publication Data

US 2019/0177504 A1    Jun. 13, 2019

Related U.S. Application Data

(62) Division of application No. 15/506,605, filed as application No. PCT/US2015/046907 on Aug. 26, 2015, now Pat. No. 10,266,665.

(60) Provisional application No. 62/050,981, filed on Sep. 16, 2014.

(51) Int. Cl.
| | | |
|---|---|---|
| C08J 9/14 | (2006.01) | |
| A62D 1/00 | (2006.01) | |
| C09K 3/30 | (2006.01) | |
| C09K 5/04 | (2006.01) | |
| F28D 15/02 | (2006.01) | |
| C11D 7/50 | (2006.01) | |
| H01B 3/56 | (2006.01) | |

(52) U.S. Cl.
CPC ............ *C08J 9/146* (2013.01); *A62D 1/0028* (2013.01); *A62D 1/0057* (2013.01); *C08J 9/143* (2013.01); *C09K 3/30* (2013.01); *C09K 5/044* (2013.01); *C09K 5/045* (2013.01); *C11D 7/505* (2013.01); *C11D 7/5063* (2013.01); *F28D 15/02* (2013.01); *H01B 3/56* (2013.01); *C08J 2201/022* (2013.01); *C08J 2203/146* (2013.01); *C08J 2203/162* (2013.01); *C08J 2203/182* (2013.01); *C08J 2205/10* (2013.01); *C08J 2300/22* (2013.01); *C08J 2300/24* (2013.01); *C08J 2323/06* (2013.01); *C08J 2325/06* (2013.01); *C08J 2375/04* (2013.01); *C09K 2205/112* (2013.01); *C09K 2205/126* (2013.01); *C09K 2205/22* (2013.01); *C09K 2205/32* (2013.01)

(58) Field of Classification Search
CPC ............................ C23G 5/032; C23G 5/02803
See application file for complete search history.

(56) References Cited

U.S. PATENT DOCUMENTS

2012/0251703 A1   10/2012   Nalewajek

FOREIGN PATENT DOCUMENTS

| JP | 10-152452 | 6/1998 |
| JP | 2003-507146 | 2/2003 |
| JP | 2011-525209 | 6/2011 |
| JP | 2012-236988 | 12/2012 |
| JP | 2014-005418 | 1/2014 |
| WO | WO 2009/155490 | 12/2009 |

OTHER PUBLICATIONS

Doherty et al, Conceptual Design of Distillation Systems, 2001, pp. 185-186 and 351-359, McGraw-Hill, New York, NY.
Null, Harold R., Phase Equilibrium in Process Design, 1970, pp. 124-126, Wiley-Interscience Publisher.
PCT International Search Report and Written Opinion in Appln. No. PCT/US2015/046907, dated Nov. 4, 2015, 4 pages.
Reid et al, Properties of Gases and Liquids, Chapter 8, pp. 241-387, 4th edition, McGraw Hill.
Walas, Stanley M., Phase Equilibria in Chemical Engineering, 1985, pp. 165-244, Butterworth Publishers.
Japanese Office Action in Japanese Appln. No. 2017-514529, dated Apr. 23, 2019, 15 pages (with English translation).

*Primary Examiner* — Peter F Godenschwager

(57) ABSTRACT

Disclosed are azeotropic or azeotrope-like compositions containing Z-1,1,1,4,4,4-hexafluoro-2-butene and methyl perfluoropropyl ether. Also disclosed is process of using the azeotropic or azeotrope-like composition as blowing agents for preparing a thermoplastic or thermoset foam. Also disclosed is a process of using the azeotropic or azeotrope-like composition as a refrigerant for producing cooling or heating. Also disclosed is a process of using such azeotropic or azeotrope-like compositions as solvents. Also disclosed is a process of using the azeotropic or azeotrope-like composition as propellants for producing an aerosol. Also disclosed is a process of using such azeotropic or azeotrope-like compositions as heat transfer media. Also disclosed is a process of extinguishing or suppressing a fire by using such azeotropic or azeotrope-like compositions. Also disclosed is a process of using such azeotropic or azeotrope-like compositions as dielectrics.

7 Claims, 1 Drawing Sheet

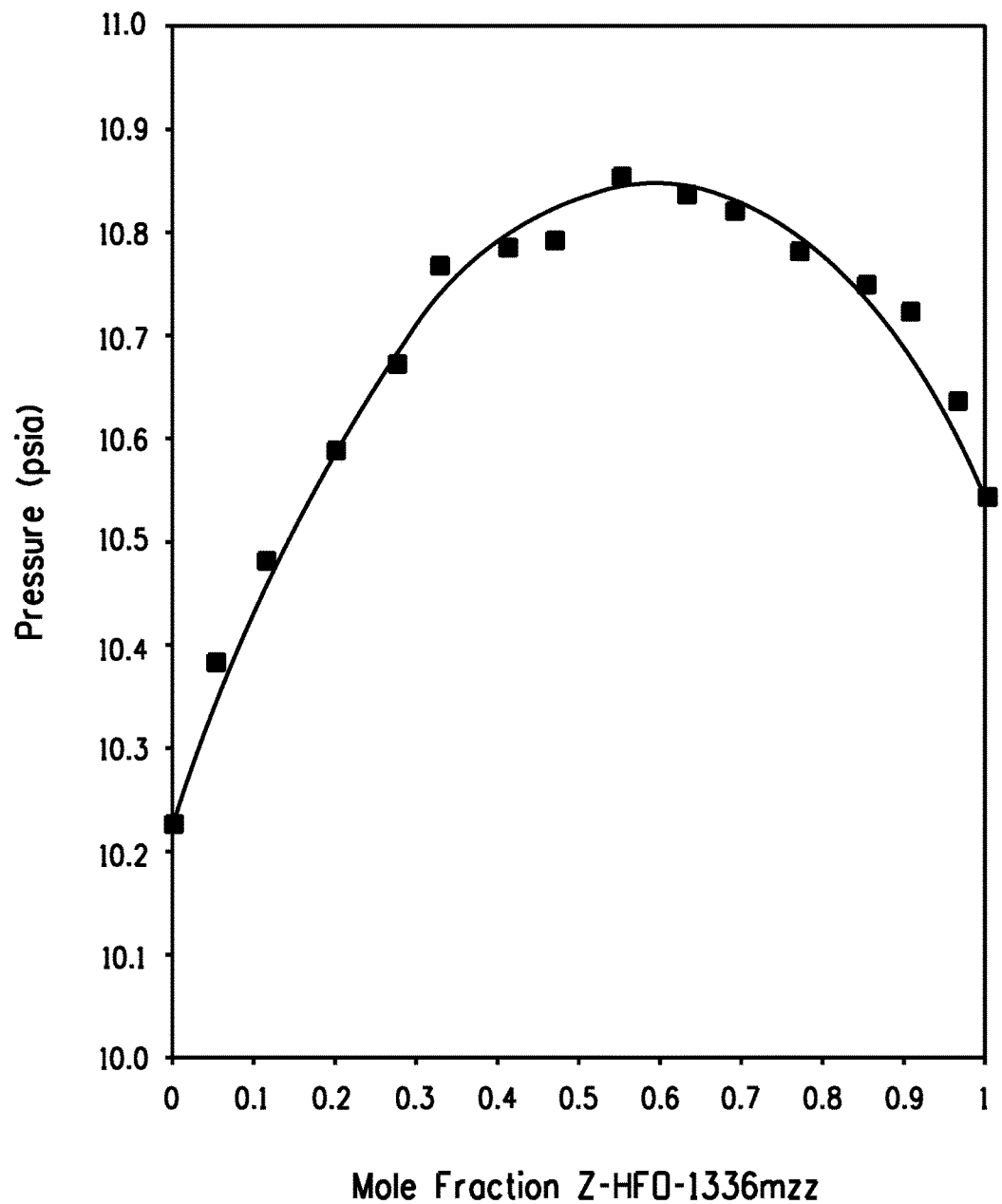

AZEOTROPIC AND AZEOTROPE-LIKE COMPOSITIONS COMPRISING Z-1,1,1,4,4,4-HEXAFLUORO-2-BUTENE AND METHYL PERFLUOROPROPYL ETHER

This application is a divisional application of and claims priority to U.S. application Ser. No. 15/506,605 filed Feb. 24, 2017, which is a U.S. national stage filing under 35 U.S.C. 371 of International Application No. PCT/US2015/046907 filed Aug. 26, 2015, and claims priority of U.S. Provisional Application No. 62/050,981 filed Sep. 16, 2014.

BACKGROUND OF THE INVENTION

Field of the Disclosure

The present disclosure relates to azeotropic or azeotrope-like compositions of Z-1,1,1,4,4,4-hexafluoro-2-butene and methyl perfluoropropyl ether.

Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs).

SUMMARY OF THE INVENTION

This disclosure provides a composition consisting essentially of Z-1,1,1,4,4,4-hexafluoro-2-butene and methyl perfluoropropyl ether, wherein the methyl perfluoro is present in an effective amount to form an azeotrope-like mixture with Z-HFO-1336mzz.

BRIEF SUMMARY OF THE DRAWINGS

FIG. 1 —FIG. 1 is a graphical representation of azeotrope-like compositions consisting essentially of Z-HFO-1336mzz and methyl perfluoropropyl ether, also known as HFE-7000, at a temperature of about 24.7° C.

DETAILED DESCRIPTION OF THE INVENTION

In many applications, the use of a pure single component or an azeotropic or azeotrope-like mixture is desirable. For example, when a blowing agent composition (also known as a foam expansion agent or foam expansion composition) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing Z-1,1,1,4,4,4-hexafluoro-2-butene (Z—CF$_3$CH═CHCF$_3$, Z—FC-1336mzz, Z-HFO-1336mzz).

Before addressing details of embodiments described below, some terms are defined or clarified. The following definitions are used herein to further define and describe the disclosure. These definitions apply to the terms as used throughout this specification, unless otherwise limited in specific instances.

1,1,1,4,4,4-hexafluoro-2-butene (HFO-1336mzz) may exist as one of two configurational isomers, E or Z. HFO-1336mzz as used herein refers to the isomers, Z-HFO-1336mzz or Z-HFO-1336mzz, as well as any combinations or mixtures of such isomers. Z-HFO-1336mzz as used herein refers to just the Z-HFO-1336mzz isomer, or the Z-HFO-1336mzz that may contain some minor amount of E-HFO-1336mzz. Z-1336mzz can be made by the reaction of 1,2-dichloro-1,1,4,4,4-pentafluorobutane with dried KF in distilled tetramethylene sulphone, which is disclosed in U.S. Pat. No. 5,463,150.

Methyl perfluoropropyl ether (HFE-7000, CH$_3$—O—CF$_2$CF$_2$CF$_3$) is available from 3M™ (St. Paul, Minn., USA).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do not materially affect the basic and novel characteristic(s) of the claimed invention. The term 'consisting essentially of' occupies a middle ground between "comprising" and 'consisting of'.

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Provided herein are compositions consisting essentially of (a) Z-HFO-1336mzz and (b) HFE-7000, wherein HFE-7000 is present in an effective amount to form an azeotropic or azeotrope-like mixture with Z-HFO-1336mzz.

By effective amount is meant an amount, which, when combined with Z-HFO-1336mzz, results in the formation of an azeotropic or azeotrope-like mixture. This definition includes the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight or mole percentages, of each component of the compositions of the instant invention which form azeotropic or azeotrope-like compositions at temperatures or pressures other than as described herein.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) are considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. The vapor-liquid equilibrium (VLE), and hence relative volatility, can be determined either isothermally or isobarically. The isothermal method requires measurement of the total pressure of mixtures of known composition at constant temperature. In this procedure, the total absolute pressure in a cell of known volume is measured at a constant temperature for various compositions of the two compounds. The isobaric method requires measurement of the temperature of mixtures of known composition at constant pressure. In this procedure, the temperature in a cell of known volume is measured at a constant pressure for various compositions of the two compounds. Use of the PTx Method is described in detail in "Phase Equilibrium in Process Design", Wiley-Interscience Publisher, 1970, written by Harold R. Null, on pages 124 to 126.

These measurements can be converted into equilibrium vapor and liquid compositions in the PTx cell by using an activity coefficient equation model, such as the Non-Random, Two-Liquid (NRTL) equation, to represent liquid phase nonidealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244. Without wishing to be bound by any theory or explanation, it is believed that the NRTL equation, together with the PTx cell data, can sufficiently predict the relative volatilities of the Z-1,1,1,4,4,4-hexafluoro-2-butene-containing compositions of the present invention and can therefore predict the behavior of these mixtures in multi-stage separation equipment such as distillation columns.

It was found through experiments that Z-HFO-1336mzz and HFE-7000 form azeotropic compositions.

To determine the relative volatility of this binary pair, the PTx method described above was used. The temperature in a PTx cell of known volume was measured at constant pressure for various binary compositions. These measurements were then reduced to equilibrium vapor and liquid compositions in the cell using the NRTL equation.

The pressures measured versus the compositions in the PTx cell for Z-HFO-1336mzz/HFE-7000 mixture are shown in FIG. 1, which graphically illustrates the formation of an azeotropic composition consisting essentially of Z-HFO-1336mzz and HFE-7000 as indicated by a mixture of about 57.4 mole % Z-HFO-1336mzz and 42.6 mole % HFE-7000 having the highest pressure over the range of compositions at about 24.7° C. Based upon these findings, it has been calculated that Z-HFO-1336mzz and HFE-7000 form azeotropic compositions ranging from about 56.5 mole percent to about 72.0 mole percent Z-HFO-1336mzz and from about 28.0 mole percent to about 43.5 mole percent HFE-7000 (which form azeotropic compositions boiling at a temperature of from about −30° C. to about 150° C. and at a pressure of from about 0.7 psia (4.83 kPa) to about 290 psia (1999 kPa)).

For example, at −20.0° C. and 1.31 psia (9.03 kPa) the azeotropic composition consists essentially of 56.7 mole percent Z-HFO-1336mzz and 43.3 mole % HFE-7000. For another example, at 32.7° C. and atmospheric pressure (14.7 psia, 101 kPa) the azeotropic composition consists essentially of 58.0 mole % Z-HFO-1336mzz and 42.0 mole % HFE-7000. Some embodiments of azeotropic compositions are listed in Table 1.

TABLE 1

Azeotropic Compositions

| Azeotropic Temperature (° C.) | Azeotropic Pressure (psia) | Z-HFO-1336mzz (mole %) | HFE-7000 (mole %) |
| --- | --- | --- | --- |
| −30.0 | 0.72 | 57.2 | 42.8 |
| −20.0 | 1.31 | 56.7 | 43.3 |
| −10.0 | 2.27 | 56.5 | 43.5 |
| 0.0 | 3.75 | 56.5 | 43.5 |
| 10.0 | 5.92 | 56.7 | 43.3 |
| 20.0 | 9.03 | 57.1 | 42.9 |
| 24.7 | 10.9 | 57.4 | 42.6 |
| 30.0 | 13.3 | 57.7 | 42.3 |
| 40.0 | 19.0 | 58.6 | 41.4 |
| 50.0 | 26.5 | 59.6 | 40.4 |
| 60.0 | 36.1 | 60.9 | 39.1 |
| 70.0 | 48.2 | 62.3 | 37.7 |
| 80.0 | 63.1 | 63.9 | 36.1 |
| 90.0 | 81.4 | 65.5 | 34.5 |
| 100.0 | 103 | 67.3 | 32.7 |
| 110.0 | 130 | 69.0 | 31.0 |
| 120.0 | 161 | 70.5 | 29.5 |
| 130.0 | 197 | 71.6 | 28.7 |
| 140.0 | 240 | 72.0 | 28.0 |
| 150.0 | 290 | 70.7 | 29.3 |

Additionally, azeotrope-like compositions containing Z-HFO-1336mzz and HFE-7000 may also be formed. According to calculation, azeotrope-like compositions consisting essentially of 1-99 mole percent Z-HFO-1336mzz and 99-1 mole % HFE-7000 are formed at temperatures ranging from about −30° C. to about 150° C. (i.e., over this temperature range, the difference in dew point pressure and bubble point pressure of the composition at a particular temperature is less than or equal to 5 percent (based upon the bubble point pressure)).

Such azeotrope-like compositions exist around azeotropic compositions. Some embodiments of azeotrope-like compositions are listed in Table 2. Some more embodiments of azeotrope-like compositions are listed in Table 3.

It was found through experiments that Z-HFO-1336mzz and HFE-7000 form azeotrope-like compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for Z-HFO-1336mzz/HFE-7000 mixture is shown in FIG. 1, which illustrates graphically the formation of azeotrope-like compositions consisting essentially of Z-1,1,1,4,4,4-hexafluoro-2-butene and HFE-7000 at 24.7° C., as indicated by mixtures of about 1 to about 19 mole % Z-1,1,1,4,4,4-hexafluoro-2-butene and about 99 to about 81 mole % HFE-7000, and by mixtures of about 38 to about 99 mole % Z-1,1,1,4,4,4-hexafluoro-2-butene and about 62 to about 1 mole % HFE-7000.

According to calculation, azeotrope-like compositions consisting essentially of from about 1 to about 99 mole percent Z-HFO-1336mzz and from about 99 to about 1 mole percent HFE-7000 are formed at temperatures ranging from about −40° C. to about 140° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 2. Additional embodiments of azeotrope-like compositions are listed in Table 3.

TABLE 2

Azeotrope-like Compositions

| Components | T (° C.) | Mole % Range |
| --- | --- | --- |
| Z-HFO-1336mzz/HFE-7000 | −30 | 1-99/99-1 |
| Z-HFO-1336mzz/HFE-7000 | 0 | 1-99/99-1 |
| Z-HFO-1336mzz/HFE-7000 | 40 | 1-99/99-1 |
| Z-HFO-1336mzz/HFE-7000 | 80 | 1-99/99-1 |
| Z-HFO-1336mzz/HFE-7000 | 120 | 1-99/99-1 |
| Z-HFO-1336mzz/HFE-7000 | 150 | 1-99/99-1 |

TABLE 3

Azeotrope-like Compositions

| Components | T (° C.) | Mole % Range |
| --- | --- | --- |
| Z-HFO-1336mzz/HFE-7000 | −30 | 5-95/95-5 |
| Z-HFO-1336mzz/HFE-7000 | 0 | 5-95/95-5 |
| Z-HFO-1336mzz/HFE-7000 | 40 | 5-95/95-5 |
| Z-HFO-1336mzz/HFE-7000 | 80 | 5-95/95-5 |
| Z-HFO-1336mzz/HFE-7000 | 120 | 5-95/95-5 |
| Z-HFO-1336mzz/HFE-7000 | 150 | 5-95/95-5 |

The azeotropic or azeotrope-like compositions of the present invention can be prepared by any convenient method including mixing or combining the desired amounts. In one embodiment of this invention, an azeotropic or azeotrope-like composition can be prepared by weighing the desired component amounts and thereafter combining them in an appropriate container.

The azeotropic or azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotropic or azeotrope-like composition as a blowing agent, wherein said azeotropic or azeotrope-like composition consists essentially of Z-1,1,1,4,4,4-hexafluoro-2-butene and HFE-7000.

In general, methods for preparing thermoset polyurethane comprise preparing a polyurethane or polyisocyanurate foam by combining an isocyanate, a polyol or mixture of polyols, a blowing agent or mixture of blowing agents comprising one or more of the present compositions, and other materials, such as catalysts, surfactants and optionally, flame retardants, colorants or other additives.

It is convenient in many applications to provide the components for polyurethane or polyisocyanurate foams in pre-blended formulations. Most typically, the foam formulations is pre-blended into two components. The isocyanate, and optionally certain surfactants and blowing agents comprise the first components, commonly referred to as the "A" component". The polyol or polyol mixture, surfactant, catalysts, blowing agents, flame retardant, and other isocyanate reactive components, as well as any small amount of water, used as a secondary blowing agent comprise the second component, commonly referred to as the "B" component. Accordingly, polyurethane or polyisocyanurate foams are readily prepard by bringing together the A and B side components either by hand mix for small preparations and, preferably, machine mix techniques to form blocks, slabs, laminates, pour9in0place panels and other items, spray applied foams, froths, and the like. Optionally, other ingredients such as fire retardants, colorants, auxiliary blowing agents, and even other polyols can be added as a third stream to the mix head or reaction site. Most preferably however, they are all incorporated into one B-component as described above.

It is also possible to produce thermoplastic foams using the compositions of the invention. For example, conventional polystyrene and polyethylene formulations may be combined with the compositions described herein in a conventional manner to produce rigid foams.

Another embodiment of this invention provides a process for producing cooling. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of Z-1,1,1,4,4,4-hexafluoro-2-butene and HFE-7000.

Another embodiment of this invention provides a process for producing heating. The process comprises condensing an azeotropic or azeotrope-like composition in the vicinity of the body to be heated and thereafter evaporating said azeotropic or azeotrope-like composition, wherein said azeotropic or azeotrope-like composition consists essentially of Z-1,1,1,4,4,4-hexafluoro-2-butene and HFE-7000.

Another embodiment of this invention provides a process using an azeotropic or azeotrope-like composition as a solvent, wherein said azeotropic or azeotrope-like composition consists essentially of Z-1,1,1,4,4,4-hexafluoro-2-butene and HFE-7000.

Another embodiment of the disclosure relates to a method of cleaning a surface comprising:

a. contacting the surface with a composition comprising a solvent, wherein the solvent consists essentially of Z-1,1,1,4,4,4-hexafluoro-2-butene and HFE-7000, and b. recovering the surface from the composition.

In one embodiment, the compositions of the invention are useful as cleaning compositions, cleaning agents, deposition solvents and as dewatering or drying solvents. In another embodiment, the invention relates to a process for removing residue from a surface or substrate comprising contacting the surface or substrate with a cleaning composition or cleaning agent of the present disclosure and, optionally, recovering the surface or substrate substantially free of residue from the cleaning composition or cleaning agent.

In yet another embodiment, the present disclosure relates to a method for cleaning surfaces by removing contaminants from the surface. The method for removing contaminants from a surface comprises contacting the surface having contaminants with a cleaning composition of the present invention to solubilize the contaminants and, optionally, recovering the surface from the cleaning composition. The surface is then substantially free of contaminants. As stated previously, the contaminants or residues that may be removed by the present method include, but are not limited to oils and greases, flux residues, and particulate contaminants.

In one embodiment of the present disclosure, the method of contacting may be accomplished by spraying, flushing, wiping with a substrate e.g., wiping cloth or paper, that has the cleaning composition incorporated in or on it. In another embodiment of the present disclosure, the method of contacting may be accomplished by dipping or immersing the article in a bath of the cleaning composition.

In one embodiment of the present disclosure, the process of recovering is accomplished by removing the surface that has been contacted from the cleaning composition bath. In another embodiment of the invention, the process of recovering is accomplished by allowing the cleaning composition that has been sprayed, flushed, or wiped on the disk to drain away. Additionally, any residual cleaning composition that may be left behind after the completion of the previous steps may be evaporated in a manner similar to that for the deposition method.

The method for cleaning a surface may be applied to the same types of surfaces as the method for deposition as described below. Semiconductor surfaces or magnetic media disks of silica, glass, metal or metal oxide, or carbon may have contaminants removed by the process of the invention. In the method described above, contaminant may be removed from a disk by contacting the disk with the cleaning composition and recovering the disk from the cleaning composition.

In yet another embodiment, the present method also provides methods of removing contaminants from a product, part, component, substrate, or any other article or portion thereof by contacting the article with a cleaning composition of the present disclosure. As referred to herein, the term "article" refers to all such products, parts, components, substrates, and the like and is further intended to refer to any surface or portion thereof.

As used herein, the term "contaminant" is intended to refer to any unwanted material or substance present on the article, even if such substance is placed on the article intentionally. For example, in the manufacture of semiconductor devices it is common to deposit a photoresist material onto a substrate to form a mask for the etching operation and to subsequently remove the photoresist material from the substrate. The term "contaminant," as used herein, is intended to cover and encompass such a photo resist material. Hydrocarbon based oils and greases and dioctylphthalate are examples of the contaminants that may be found on the carbon coated disks.

In one embodiment, the method of the invention comprises contacting the article with a cleaning composition of the invention, in a vapor degreasing and solvent cleaning method. In one such embodiment, vapor degreasing and solvent cleaning methods consist of exposing an article, preferably at room temperature, to the vapors of a boiling cleaning composition. Vapors condensing on the object have the advantage of providing a relatively clean, distilled cleaning composition to wash away grease or other contamination. Such processes thus have an additional advantage in that final evaporation of the present cleaning composition from the object leaves behind relatively little residue as compared to the case where the object is simply washed in liquid cleaning composition.

In another embodiment, for applications in which the article includes contaminants that are difficult to remove, the method of the invention involves raising the temperature of the cleaning composition above ambient temperature or to any other temperature that is effective in such application to substantially improve the cleaning action of the cleaning composition. In one such embodiment, such processes are also generally used for large volume assembly line operations where the cleaning of the article, particularly metal parts and assemblies, must be done efficiently and quickly.

In one embodiment, the cleaning methods of the present disclosure comprise immersing the article to be cleaned in liquid cleaning composition at an elevated temperature. In another embodiment, the cleaning methods of the present disclosure comprise immersing the article to be cleaned in liquid cleaning composition at about the boiling point of the cleaning composition. In one such embodiment, this step removes a substantial amount of the target contaminant from the article. In yet another embodiment, this step removes a major portion of the target contaminant from the article. In one embodiment, this step is then followed by immersing the article in freshly distilled cleaning composition, which is at a temperature below the temperature of the liquid cleaning composition in the preceding immersion step. In one such embodiment, the freshly distilled cleaning composition is at about ambient or room temperature. In yet another embodiment, the method also includes the step of then contacting the article with relatively hot vapor of the cleaning composition by exposing the article to vapors rising from the hot/boiling cleaning composition associated with the first mentioned immersion step. In one such embodiment, this results in condensation of the cleaning composition vapor on the article. In certain preferred embodiments, the article may be sprayed with distilled cleaning composition before final rinsing.

Another embodiment of this invention provides a process for producing an aerosol product. The process comprises using an azeotropic or azeotrope-like composition as a propellant, wherein said azeotropic or azeotrope-like composition consists essentially of Z-1,1,1,4,4,4-hexafluoro-2-butene and HFE-7000.

Another embodiment of this invention provides a process using an azeotropic or azeotrope-like composition as a heat transfer media, wherein said azeotropic or azeotrope-like composition consists essentially of Z-1,1,1,4,4,4-hexafluoro-2-butene and HFE-7000.

Apparatus

In certain embodiments, the invention includes an apparatus requiring heat transfer. The apparatus comprises a device and a mechanism for transferring heat to or from the device using a heat-transfer fluid. Such apparatus include refrigeration systems, cooling systems, testing equipment, and machining equipment.

Examples of an apparatus of the present invention include, but are not limited to, test heads used in automated test equipment for testing the performance of semiconductor dice; wafer chucks used to hold silicon wafers in ashers, steppers, etchers, PECVD tools; constant temperature baths, and thermal shock test baths.

Device

In certain embodiments, the present invention comprises a device. The device is defined herein as a component, work-piece, assembly, etc. to be cooled, heated or maintained at a selected temperature. Such devices include electrical components, mechanical components and optical components. Examples of devices of the present invention include, but are not limited to microprocessors, wafers used to manufacture semiconductor devices, power control semiconductors, electrical distribution switch gear, power transformers, circuit boards, multi-chip modules, packaged and unpackaged semiconductor devices, chemical reactors, nuclear reactors, fuel cells, lasers, and missile components.

Heat Transfer Mechanism

In certain embodiments, the present invention comprises a mechanism for transferring heat. Heat is transferred by placing the heat transfer mechanism in thermal contact with the device. The heat transfer mechanism, when placed in thermal contact with the device, removes heat from the device or provides heat to the device, or maintains the device at a selected temperature. The direction of heat flow (from device or to device) is determined by the relative temperature difference between the device and the heat transfer mechanism.

The heat transfer mechanism comprises the heat-transfer fluid of the present invention.

Additionally, the heat transfer mechanism may include facilities for managing the heat-transfer fluid, including, but not limited to: pumps, valves, fluid containment systems, pressure control systems, condensers, heat exchangers, heat sources, heat sinks, refrigeration systems, active temperature control systems, and passive temperature control systems. In some embodiments, the heat sink comprises a vapor compression chiller system.

Examples of suitable heat transfer mechanisms include, but are not limited to, temperature controlled wafer chucks in PECVD tools, temperature controlled test heads for die performance testing, temperature controlled work zones within semiconductor process equipment, thermal shock test bath liquid reservoirs, and constant temperature baths.

In some systems, such as etchers, ashers, PECVD chambers, thermal shock testers, the upper desired operating temperature may be as high as 150° C.

Method

The present invention additionally comprises a method for transferring heat comprising the steps of: providing a device, providing a mechanism for transferring heat comprising a heat-transfer fluid, and using the heat-transfer fluid to transfer heat to or from the device, wherein the heat-transfer fluid composition consists essentially of Z-1,1,1,4,4-hexafluoro-2-butene and HFE-7000.

Another embodiment of this invention provides a process for extinguishing or suppressing a fire. The process comprises using an azeotropic or azeotrope-like composition as a fire extinguishing or suppression agent, wherein said azeotropic or azeotrope-like composition consists essentially of Z-1,1,1,4,4-hexafluoro-2-butene and HFE-7000.

In one embodiment, the method comprises contacting a flame with a fluid which consists essentially of Z-1,1,1,4,4,4-hexafluoro-2-butene and HFE-7000. Any suitable method for contacting the flame with the present composition may be used. For example, a composition of the present invention may be sprayed, poured and the like onto the flame, or at least a portion of the flame may be immersed in the composition. In light of the teachings herein, those of skill in the art will be readily able to adapt a variety of conventional apparatus and methods of flame suppression for use in the present invention.

Another embodiment of this invention provides a process using an azeotropic or azeotrope-like composition as dielectrics, wherein said azeotropic or azeotrope-like composition consists essentially of Z-1,1,1,4,4,4-hexafluoro-2-butene and HFE-7000.

What is claimed is:

1. A method for removing residue from a surface of an article comprising contacting a surface of an article with a composition consisting essentially of:
    (a) Z-1,1,1,4,4,4-hexafluoro-2-butene; and
    (b) methyl perfluoropropyl ether; wherein the methyl perfluoropropyl ether is present in an effective amount to form an azeotrope-like combination or an azeotropic combination with the Z-1,1,1,4,4,4-hexafluoro-2-butene;
and recovering said surface from the composition,
wherein the surface is chosen from semiconductor surfaces or magnetic media disks of silica, glass, metal or metal oxide, or carbon and the residue is chosen from oils and greases, flux residues, and particulate contaminants.

2. The method of claim 1, wherein said contacting is accomplished by vapor degreasing.

3. The method of claim 1, wherein the methyl perfluoropropyl ether is present in an effective amount to form an azeotrope-like combination with the Z-1,1,1,4,4,4-hexafluoro-2-butene.

4. The method of claim 1, wherein the methyl perfluoropropyl ether is present in an effective amount to form an azeotropic combination with the Z-1,1,1,4,4,4-hexafluoro-2-butene.

5. The method of claim 1, wherein said contacting is accomplished by spraying, flushing, wiping with a substrate, wherein wiping using a wiping cloth or paper, that has the composition incorporated in or on it.

6. The method of claim 1, wherein said contacting is accomplished by dipping or immersing the article in a bath of the composition.

7. The method of claim 6, wherein the article is immersed in the composition at an elevated temperature.

* * * * *